United States Patent
Glasco et al.

(10) Patent No.: US 7,039,740 B2
(45) Date of Patent: May 2, 2006

(54) INTERRUPT HANDLING IN SYSTEMS HAVING MULTIPLE MULTI-PROCESSOR CLUSTERS

(75) Inventors: David Brian Glasco, Austin, TX (US); Carl Zeitler, Tomball, TX (US)

(73) Assignee: Newisys, Inc., Austin, TX (US)

( * ) Notice: Subject to any disclaimer, the term of this patent is extended or adjusted under 35 U.S.C. 154(b) by 364 days.

(21) Appl. No.: 10/200,471

(22) Filed: Jul. 19, 2002

(65) Prior Publication Data

US 2004/0015628 A1 Jan. 22, 2004

(51) Int. Cl.
*G06F 13/24* (2006.01)

(52) U.S. Cl. .................. 710/266; 710/268; 710/316

(58) Field of Classification Search .............. 710/260, 710/261, 263, 264, 266, 268, 316, 317; 709/208, 709/238, 245, 249
See application file for complete search history.

(56) References Cited

U.S. PATENT DOCUMENTS

| | | | |
|---|---|---|---|
| 5,404,535 A * | 4/1995 | Barlow et al. ............ | 710/264 |
| 5,987,538 A * | 11/1999 | Tavallaei et al. ............ | 710/48 |
| 6,167,492 A | 12/2000 | Keller et al. | |
| 6,205,508 B1 | 3/2001 | Bailey et al. | |
| 6,295,573 B1 | 9/2001 | Bailey et al. | |
| 6,385,705 B1 | 5/2002 | Keller et al. | |
| 6,490,661 B1 | 12/2002 | Keller et al. | |
| 6,611,911 B1 * | 8/2003 | O'Shea et al. ............ | 713/1 |
| 6,687,818 B1 * | 2/2004 | Svenkeson et al. ............ | 713/2 |

OTHER PUBLICATIONS

INTEL Multiprocessor Specification, Version 1.4, pp. 63-64.*
HyperTransport™ I/O Link Specification Revision 1.03, HyperTransport™ Consortium, Oct. 10, 2001, Copyright © 2001 HyperTransport Technology Consortium.

* cited by examiner

Primary Examiner—Khanh Dang
(74) Attorney, Agent, or Firm—Beyer Weaver & Thomas, LLP

(57) ABSTRACT

An interconnection controller for use in a computer system having a plurality of processor clusters is described. Each cluster includes a plurality of local nodes and an instance of the interconnection controller. The interconnection controller is operable to transmit locally generated interrupts to others of the clusters, and remotely generated interrupts to the local nodes. The interconnection controller is further operable to aggregate locally generated interrupt responses for transmission to a first remote cluster from which a first interrupt corresponding to the locally generated responses was generated. The interconnection controller is also operable to aggregate remotely generated responses for transmission to a first local node from which a second interrupt corresponding to the remotely generated responses was generated. A computer system employing such an interconnection controller is also described.

32 Claims, 7 Drawing Sheets

INTERRUPT HANDLING IN SYSTEMS HAVING MULTIPLE MULTI-PROCESSOR CLUSTERS

BACKGROUND OF THE INVENTION

The present invention relates generally to multi-processor computer systems. More specifically, the present invention provides techniques for handling arbitrated, fixed, and non-vectored interrupts in systems having a plurality of multi-processor clusters.

In computer systems, and particularly multi-processor computer systems, interrupts are mechanisms that an I/O device or a processor can use to signal another processor. Typically, code corresponding to the interrupt is executed on the targeted processor when the interrupt is received. A common infrastructure for communicating such interrupts employs dedicated wires from each device capable of generating an interrupt to an advanced programmable interrupt controller (APIC) which combines and forwards interrupts to the appropriate devices.

A relatively new approach to the design of multi-processor systems replaces broadcast communication among processors with a point-to-point data transfer mechanism in which the processors communicate similarly to network nodes in a distributed computing system. That is, the processors are interconnected via a plurality of communication links and requests are transferred among the processors over the links according to routing tables associated with each processor. The intent is to increase the amount of information transmitted within a multi-processor platform per unit time. In such systems, the point-to-point infrastructure is employed to communicate interrupts rather than the dedicated infrastructure of earlier systems.

One limitation associated with such an architecture is that the node ID address space associated with the point-to-point infrastructure is fixed, therefore allowing only a limited number of nodes to be interconnected. In addition, the infrastructure is flat, therefore allowing a single level of mapping for address spaces and routing functions. As a result, interrupts are only visible to nodes (e.g., processors) in a single processor cluster defined by the limited node ID space. That is, this architecture does not provide a mechanism by which interrupts may be seen by processors in remote clusters. Therefore, construction of systems based on this architecture which include more than one multi-processor cluster is problematic. It is therefore desirable to provide techniques by which computer systems employing this infrastructure are not so limited.

SUMMARY OF THE INVENTION

According to the present invention, techniques are provided by which interrupts may be made visible to all processors in a computer system having a plurality of multi-processor clusters despite the fact that each cluster employs interrupt handling protocols in which only a limited number of processors is identified. This is accomplished through the use of an interconnection controller which abstracts the global processor space outside of each cluster and which handles the communication of interrupts and responses between clusters such that the processors in each cluster need not be "aware" of the existence of the remote processers/clusters.

Thus, according to a specific embodiment, the present invention provides an interconnection controller for use in a computer system having a plurality of processor clusters. Each cluster includes a plurality of local nodes and an instance of the interconnection controller. The interconnection controller comprises circuitry which is operable to transmit locally generated interrupts to others of the clusters, and remotely generated interrupts to the local nodes. The circuitry is further operable to aggregate locally generated interrupt responses for transmission to a first remote cluster from which a first interrupt corresponding to the locally generated responses was generated. The circuitry is also operable to aggregate remotely generated responses for transmission to a first local node from which a second interrupt corresponding to the remotely generated responses was generated. According to a specific embodiment, a computer system employing such an interconnection controller is also provided.

According to one embodiment, an interconnection controller is provided for use in a computer system having a plurality of processor clusters. Each cluster includes a plurality of local nodes and an instance of the interconnection controller. The interconnection controller comprises circuitry which is operable to transmit a first interrupt generated by first local node to others of the clusters. The interconnection controller circuitry is also operable to aggregate remotely generated responses corresponding to the first interrupt for transmission to the first local node. According to another embodiment, an interconnection controller is provided for use in a computer system having a plurality of processor clusters. Each cluster includes a plurality of local nodes and an instance of the interconnection controller. The interconnection controller comprises circuitry which is operable to transmit a first interrupt generated in a remote cluster to the local nodes. The interconnection controller circuitry is also operable to aggregate locally generated interrupt responses corresponding to the first interrupt for transmission to the remote cluster. According to various embodiments, computer systems employing such interconnection controllers are also provided.

According to yet another embodiment, a computer system is provided which includes a plurality of processor clusters. Each cluster includes a plurality of local nodes and an interconnection controller. Each cluster also has a local interrupt handling protocol associated therewith. Each interconnection controller is operable to represent all remote clusters to the associated local nodes such that the local interrupt handling protocol may be extended to a global interrupt handling protocol in which all of the nodes in the system receive and respond to each locally generated interrupt.

A further understanding of the nature and advantages of the present invention may be realized by reference to the remaining portions of the specification and the drawings.

DETAILED DESCRIPTION OF SPECIFIC EMBODIMENTS

Reference will now be made in detail to some specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. Multi-processor architectures having point-to-point communication among their processors are suitable for implementing specific embodiments of the present invention. In the following description, numerous specific details are set forth in order to provide a thorough understanding of the present invention. The present invention may be practiced without some or all of these specific details. Well known process operations have not been described in detail in order not to unnecessarily obscure the present invention. Furthermore, the present application's reference to a particular singular entity includes that possibility that the methods and apparatus of the present invention can be implemented using more than one entity, unless the context clearly dictates otherwise.

Figure 1A:
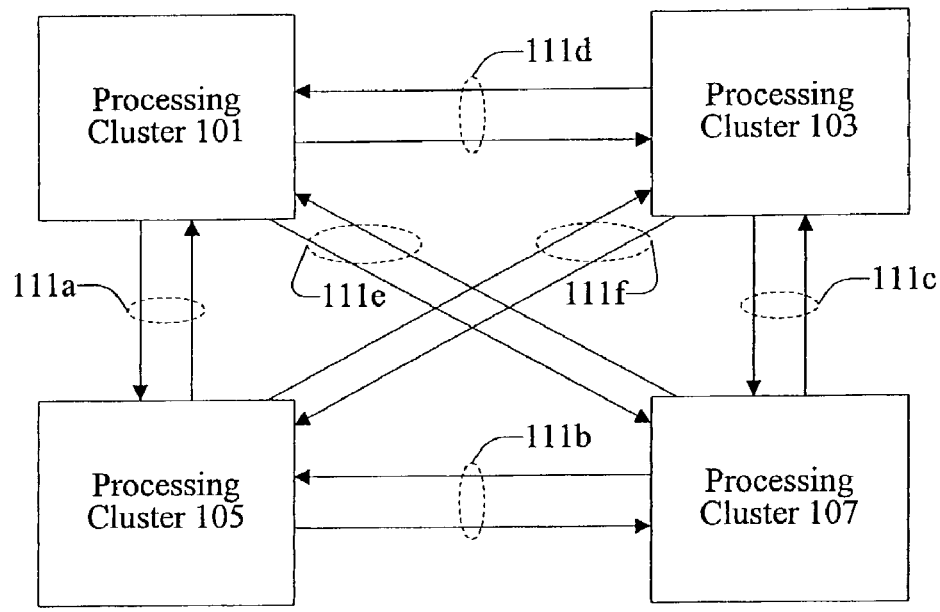
FIGS. 1A and 1B are diagrammatic representations depicting systems having multiple clusters.

FIG. 1A is a diagrammatic representation of one example of a multiple cluster, multiple processor system which may employ the techniques of the present invention. Each processing cluster 101, 103, 105, and 107 includes a plurality of processors. The processing clusters 101, 103, 105, and 107 are connected to each other through point-to-point links 11a–f. The multiple processors in the multiple cluster architecture shown in FIG. 1A share a global memory space. In this example, the point-to-point links 11a–f are internal system connections that are used in place of a traditional front-side bus to connect the multiple processors in the multiple clusters 101, 103, 105, and 107. The point-to-point links may support any point-to-point coherence protocol.

Figure 1B:
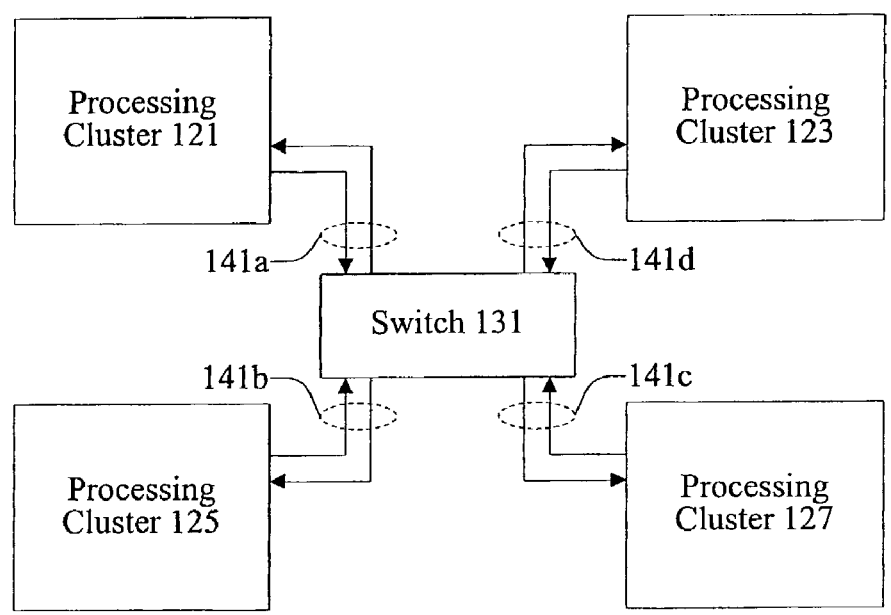

FIG. 1B is a diagrammatic representation of another example of a multiple cluster, multiple processor system that may employ the techniques of the present invention. Each processing cluster 121, 123, 125, and 127 is coupled to a switch 131 through point-to-point links 141a–d. It should be noted that using a switch and point-to-point links allows implementation with fewer point-to-point links when connecting multiple clusters in the system. A switch 131 can include a processor with a coherence protocol interface. According to various implementations, a multi-cluster system shown in FIG. 1A may be expanded using a switch 131 as shown in FIG. 1B.

Figure 2:
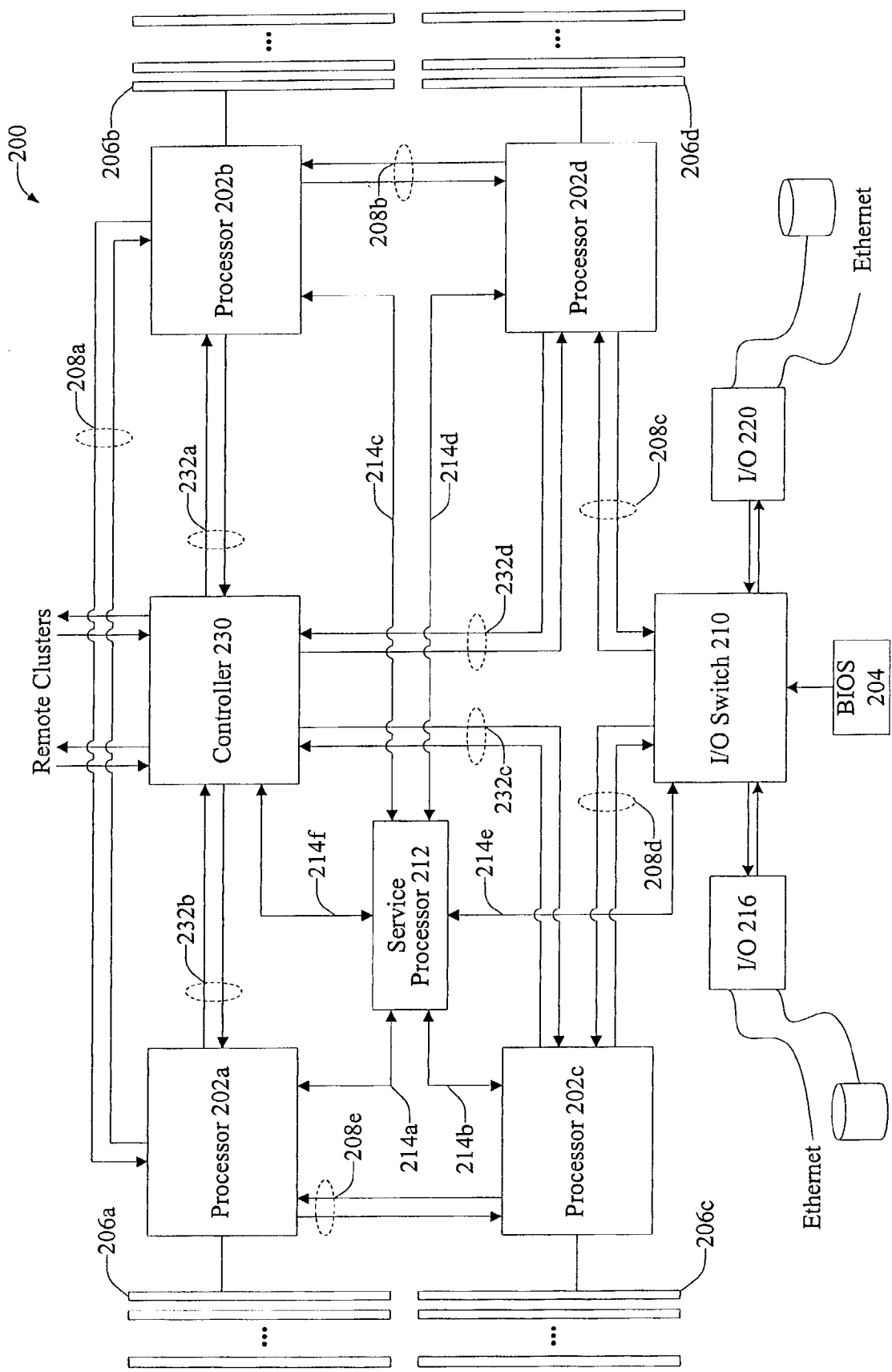
FIG. 2 is a diagrammatic representation of an exemplary cluster having a plurality of processors for use with specific embodiments of the present invention.

FIG. 2 is a diagrammatic representation of a multiple processor cluster such as, for example, cluster 101 shown in FIG. 1A. Cluster 200 includes processors 202a–202d, one or more Basic I/O systems (BIOS) 204, a memory subsystem comprising memory banks 206a–206d, point-to-point communication links 208a–208e, and a service processor 212. The point-to-point communication links are configured to allow interconnections between processors 202a–202d, I/O switch 210, and interconnection controller 230. The service processor 212 is configured to allow communications with processors 202a–202d, I/O switch 210, and interconnection controller 230 via a JTAG interface represented in FIG. 2 by links 214a–214f. It should be noted that other interfaces are supported. I/O switch 210 connects the rest of the system to I/O adapters 216 and 220.

According to specific embodiments, the service processor of the present invention has the intelligence to partition system resources according to a previously specified partitioning schema. The partitioning can be achieved through direct manipulation of routing tables associated with the system processors by the service processor which is made possible by the point-to-point communication infrastructure. The routing tables are used to control and isolate various system resources, the connections between which are defined therein.

The processors 202a–d are also coupled to an interconnection controller 230 through point-to-point links 232a–d. According to various embodiments and as will be described below in greater detail, interconnection controller 230 performs a variety of functions which enable the number of interconnected processors in the system to exceed the node ID space associated with each of a plurality of processor clusters. Such functions include, but are not limited to, the communication of interrupts and associated transmissions among the clusters. According to some embodiments, interconnection controller 230 performs a variety of other functions including the maintaining of cache coherency across clusters. Interconnection controller 230 can be coupled to similar controllers associated with other multiprocessor clusters. It should be noted that there can be more than one such interconnection controller in one cluster. Interconnection controller 230 communicates with both processors 202a–d as well as remote clusters using a point-to-point protocol.

More generally, it should be understood that the specific architecture shown in FIG. 2 is merely exemplary and that embodiments of the present invention are contemplated having different configurations and resource interconnections, and a variety of alternatives for each of the system resources shown. However, for purpose of illustration, specific details of cluster 200 will be assumed. For example, most of the resources shown in FIG. 2 are assumed to reside on a single electronic assembly. In addition, memory banks 206a–206d may comprise double data rate (DDR) memory which is physically provided as dual in-line memory modules (DIMMs). I/O adapter 216 may be, for example, an ultra direct memory access (UDMA) controller or a small computer system interface (SCSI) controller which provides access to a permanent storage device. I/O adapter 220 may be an Ethernet card adapted to provide communications with a network such as, for example, a local area network (LAN) or the Internet.

According to one embodiment, service processor 212 is a Motorola MPC855T microprocessor which includes integrated chipset functions, and interconnection controller 230 is an Application Specific Integrated Circuit (ASIC) supporting the local point-to-point coherence protocol. Interconnection controller 230 can also be configured to handle a non-coherent protocol to allow communication with I/O devices. In one embodiment, interconnection controller 230 is a specially configured programmable chip such as a programmable logic device or a field programmable gate array. In another embodiment, interconnection controller 230 is a general purpose processor with an interface to point-to-point links 232a–d.

Figure 3:
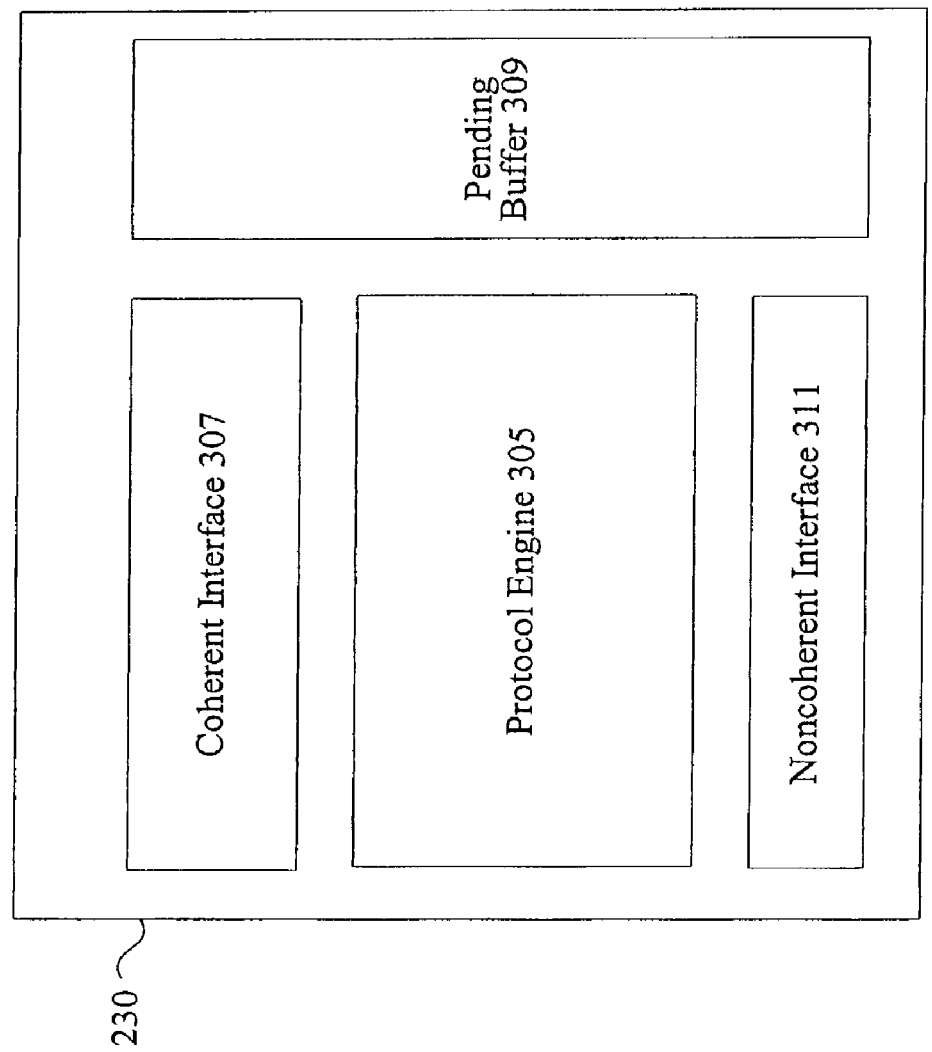
FIG. 3 is a diagrammatic representation of an exemplary interconnection controller for facilitating various embodiments of the present invention.

FIG. 3 is a diagrammatic representation of one example of an interconnection controller 230 for facilitating various aspects of the present invention. According to various embodiments, the interconnection controller includes a protocol engine 305 configured to handle packets such as probes and requests received from processors in various clusters of a multiprocessor system. The functionality of the protocol engine 305 can be partitioned across several engines to improve performance. In one example, partitioning is done based on packet type (request, probe and response), direction (incoming and outgoing), or transaction flow (request flows, probe flows, etc).

The protocol engine 305 has access to a pending buffer 309 that allows the interconnection controller to track transactions such as recent requests and probes and associate the transactions with specific processors. Transaction information maintained in the pending buffer 309 can include transaction destination nodes, the addresses of requests for subsequent collision detection and protocol optimizations, response information, tags, and state information.

The interconnection controller has a coherent protocol interface 307 that allows the interconnection controller to communicate with other processors in the cluster as well as external processor clusters. The interconnection controller may also include other interfaces such as a non-coherent protocol interface 311 for communicating with I/O devices. According to various embodiments, each interface 307 and 311 is implemented either as a full crossbar or as separate receive and transmit units using components such as multiplexers and buffers. It should be noted that the interconnection controller 230 does not necessarily need to provide both coherent and non-coherent interfaces. It should also be noted that an interconnection controller 230 in one cluster can communicate with an interconnection controller 230 in another cluster.

Figure 4:
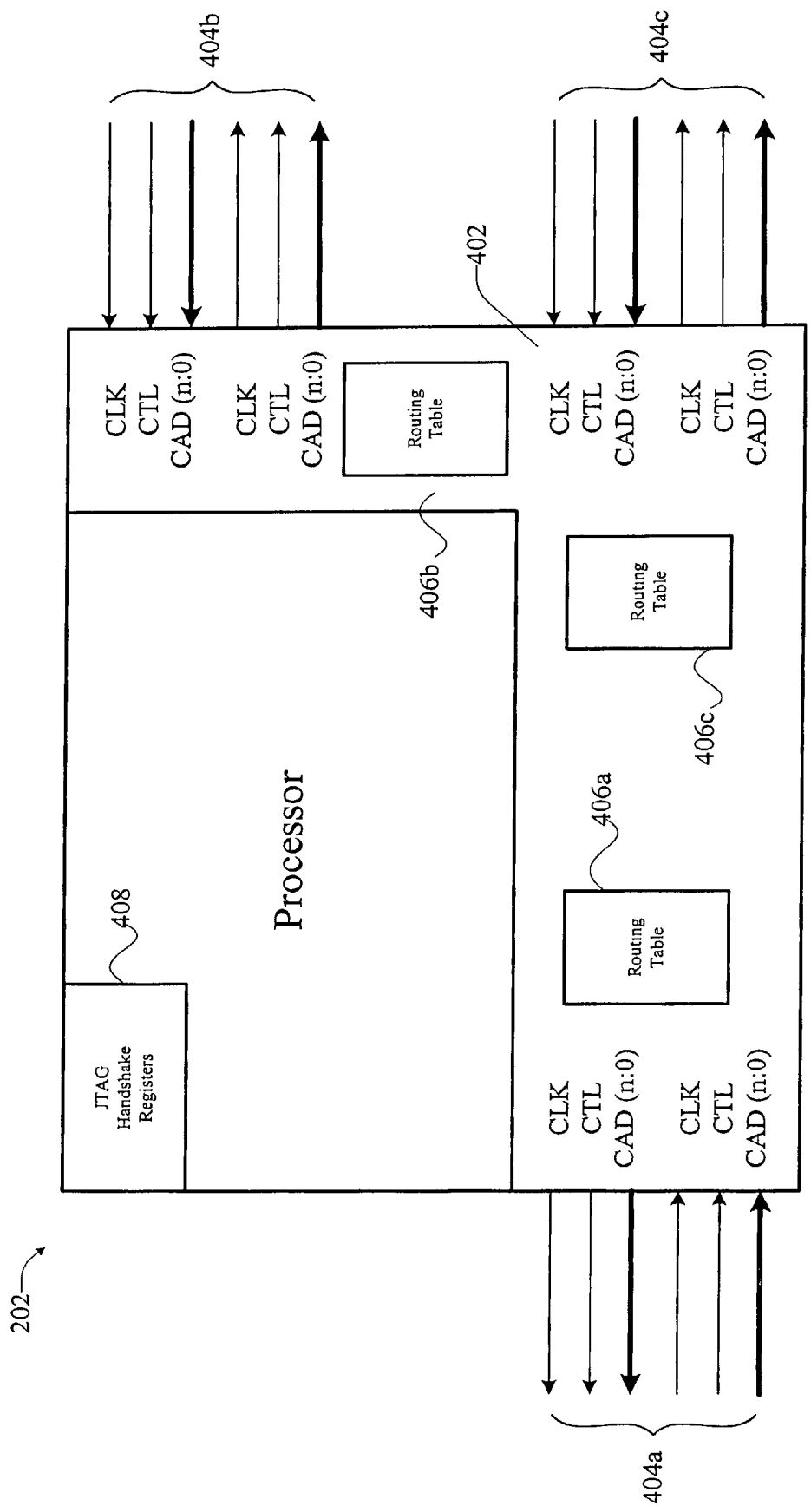
FIG. 4 is a diagrammatic representation of a local processor for use with various embodiments of the present invention.

According to various embodiments of the invention, processors 202a–202d are substantially identical. FIG. 4 is a simplified block diagram of such a processor 202 which includes an interface 402 having a plurality of ports 404a–404c and routing tables 406a–406c associated therewith. Each port allows communication with other resources, e.g., processors or I/O devices, in the computer system via associated links, e.g., links 208a–208e of FIG. 2.

The infrastructure shown in FIG. 4 can be generalized as a point-to-point, distributed routing mechanism which comprises a plurality of segments interconnecting the systems processors according to any of a variety of topologies, e.g., ring, mesh, etc. Each of the endpoints of each of the segments is associated with a connected processor which has a unique node ID and a plurality of associated resources which it "owns," e.g., the memory and I/O to which it's connected.

The routing tables associated with each of the nodes in the distributed routing mechanism collectively represent the current state of interconnection among the computer system resources. Each of the resources (e.g., a specific memory range or I/O device) owned by any given node (e.g., processor) is represented in the routing table(s) associated with the node as an address. When a request arrives at a node, the requested address is compared to a two level entry in the node's routing table identifying the appropriate node and link, i.e., given a particular address within a range of addresses, go to node x; and for node x use link y.

As shown in FIG. 4, processor 202 can conduct point-to-point communication with three other processors according to the information in the associated routing tables. According to a specific embodiment, routing tables 406a–406c comprise two-level tables, a first level associating the unique addresses of system resources (e.g., a memory bank) with a corresponding node (e.g., one of the processors), and a second level associating each node with the link (e.g., 208a–208e) to be used to reach the node from the current node.

Processor 202 also has a set of JTAG handshake registers 408 which, among other things, facilitate communication between the service processor (e.g., service processor 212 of FIG. 2) and processor 202. That is, the service processor writes routing table entries to handshake registers 408 for eventual storage in routing tables 406a–406c. It should be understood that the processor architecture depicted in FIG. 4 is merely exemplary for the purpose of describing a specific embodiment of the present invention. For example, a fewer or greater number of ports and/or routing tables may be used to implement other embodiments of the invention.

As mentioned above, the basic protocol upon which the clusters in specific embodiments of the invention are based provides for a limited node ID space which, according to a particular implementation, is a 3-bit space, therefore allowing for the unique identification of only 8 nodes. That is, if the basic protocol is employed without the innovations represented by the present invention, only 8 nodes may be interconnected in a single cluster via the point-to-point infrastructure. To get around this limitation, a hierarchical mechanism is provided which preserves the single-layer identification scheme within particular clusters while enabling interconnection with and communication between other similarly situated clusters and processing nodes.

According to a specific embodiment, one of the nodes in each multi-processor cluster is an interconnection controller, e.g., interconnection controller 230 of FIG. 2, which manages the hierarchical mapping of information thereby enabling multiple clusters to share a single memory address space while simultaneously allowing the processors within its cluster to operate and to interact with any processor in any cluster without "knowledge" of anything outside of their own cluster. The interconnection controller appears to its associated processor to be just another one of the processors or nodes in the cluster.

In the basic protocol, when a particular processor in a cluster generates a request, a set of address mapping tables are employed to map the request to one of the other nodes in the cluster. That is, each node in a cluster has a portion of a shared memory space with which it is associated. There are different types of address mapping tables for main memory, memory-mapped I/O, different types of I/O space, etc. These address mapping tables map the address identified in the request to a particular node in the cluster.

A set of routing tables are then employed to determine how to get from the requesting node to the node identified from the address mapping table. That is, as discussed above, each processor (i.e., cluster node) has associated routing tables which identify a particular link in the point-to-point infrastructure which may be used to transmit the request from the current node to the node identified from the address mapping tables. Although generally a node may correspond to one or a plurality of resources (including, for example, a processor), it should be noted that the terms node and processor are often used interchangeably herein. According to a particular implementation, a node comprises multiple sub-units, e.g., CPUs, memory controllers, I/O bridges, etc., each of which has a unit ID.

In addition, because individual transactions may be segmented in non-consecutive packets, each packet includes a unique transaction tag to identify the transaction with which the packet is associated with reference to the node which initiated the transaction. According to a specific implementation, a transaction tag identifies the source node (3-bit field), the source node unit (2-bit field), and a transaction ID (5-bit field).

Thus, when a transaction is initiated at a particular node, the address mapping tables are employed to identify the destination node (and unit) which are then appended to the packet and used by the routing tables to identify the appropriate link(s) on which to route the packet. The source information is used by the destination node and any other nodes which are probed with the request to respond to the request appropriately.

The interconnection controller in each cluster appears to the other processors in its cluster as just another processor in the cluster. However, the portion of the shared memory space associated with the interconnection controller actually encompasses the remainder of the globally shared memory space, i.e., the memory associated with all other clusters in the system. That is, from the perspective of the local processors in a particular cluster, the memory space associated with all of the other multi-processor clusters in the system are represented by the interconnection controller(s) in their own cluster.

To extend the address mapping function beyond a single cluster, the interconnection controller in each cluster maintains two mapping tables: a global map and local map. The global map maps outgoing requests to remote clusters. The local map maps incoming requests from remote clusters to a particular node within the local cluster.

As described above, on the local cluster level, information from address mapping tables is used to identify the appropriate link on which to transmit information to a destination node within the cluster. To effect transmissions between clusters using the global mapping described above, a similar mechanism is provided. That is, in addition to the local routing tables associated with each node in a cluster, the interconnection controller maintains global routing information which maps the other clusters in the system to the various transmission links interconnecting the clusters (e.g., links 111 of FIG. 1A).

In general, the importance of the unique identification of transactions in a multiprocessor environment is understood. And where the transaction identification or tag space is limited, mechanisms to extend it are needed to enable the interconnection of more than the maximum number of processors supported by the limited tag space. That is, in an environment with a plurality of clusters operating with identical local transaction tag spaces, there is a potential for more than one transaction to be generated in different clusters simultaneously with the identical tag. Where those transactions occur between nodes in different clusters, the potential for conflict is obvious. Therefore, mechanisms are provided which extend the local tag spaces such that each transaction in the multi-cluster system is uniquely identified.

More specifically, transactions are mapped from the local transaction tag space to a larger global transaction tag space. As described above, the local tag space is specified using the node ID, the unit ID, and a transaction ID. On top of that, the global tag space is specified using a global cluster ID and a global transaction ID. According to one implementation, the interconnection controllers in the system use their pending buffers to simplify the allocation and management of the mapping and remapping actions.

As discussed above, the basic protocol by which interrupts are handled within a cluster is limited by the fixed local node ID space. Therefore, according to various embodiments, the present invention provides mechanisms by which interrupts may be communicated among multiple clusters. According to specific ones of these embodiments, the hierarchical request mapping functions described above are employed to facilitate this communication.

Specific embodiments of the invention for handling fixed, non-vectored, and arbitrated interrupts will now be described. In the description of these embodiments, it will be assumed that each node within a cluster includes at least one processor and an I/O bridge or host bridge. It will be understood, however, that this assumption is merely illustrative and a wide variety of node and cluster configurations are within the scope of the invention.

According to the basic protocol within a cluster, when a processor or I/O device associated with a particular node generates an interrupt, the interrupt goes to the node's host bridge which broadcasts the interrupt as one or more packets on the cluster's point-to-point infrastructure to all of the processors in the cluster (including the cluster's interconnection controller). The basic protocol includes three types of interrupts: fixed, non-vectored, and arbitrated. According to various embodiments of the invention, fixed and non-vectored interrupts, also referred to herein generically as directed interrupts, are handled similarly.

Arbitrated interrupts are interrupts which may be handled by any one of a plurality of processors in the systems. Examples of arbitrated interrupts include the case in which a single processor or a limited number of processors handle the interrupts for the total system or the case in which the processor with the lowest priority at the instant in time that the interrupt is presented handles the interrupt. According to the single-cluster basic protocol on which specific embodiments of the invention are based, when each processor in the cluster receives an arbitrated interrupt it determines whether it was a target processor, a focus processor, or neither.

A targeted processor is capable of handling interrupts. It returns its priority along with its identifier. If there are multiple targeted processors, the one with the lowest priority is chosen. In the event of multiple targeted processors with the same priority, the arbiter will pick one of its choosing. A targeted focus processor is one designated to handle interrupts and will be chosen over a targeted only processor. In the event of multiple focus processors, the one with the lowest priority is chosen. In the event of multiple focus processors with the same priority, the arbiter will pick one of its choosing.

All of the processors then respond to the device generating the interrupt identifying themselves as one of these three options. The interrupt generating device then selects from among the processors identifying themselves as target or focus processors and rebroadcasts the interrupt as a directed interrupt to the selected processor. All processors respond to the interrupt generating device, indicating if they will handle the interrupt. Only the processor to which the interrupt was directed returns a positive response.

Fixed and non-vectored (i.e., directed) interrupts are interrupts which are directed to a specific processor in the cluster. Examples of directed interrupts include inter-processor interrupts, non-maskable interrupts and system management interrupts. According to the single-cluster basic protocol on which specific embodiments of the invention are based, when each processor in the cluster receives a non-posted broadcast directed (i.e., fixed or non-vectored) interrupt, it determines whether or not it was the target of the interrupt and sends a corresponding response to the host bridge which broadcast the interrupt. If the processor receiving the interrupt was not the target, its response to the host bridge indicates that it was not the target. If, on the other hand, it was the target, its response indicates that it was the target and that it is handling the interrupt.

According to various implementations, the determination as to whether a processor has been targeted by a particular interrupt may be done with reference to the device from which the interrupt originated. That is, for example, if a processor is currently executing a process involving the device which generated the interrupt, that processor will likely identify itself as the target of an interrupt when it looks at the interrupt packet and recognizes that the interrupt originated from that device. The target processor can then identify itself as such in its response by, for example, setting a corresponding bit in the response packet(s).

As mentioned above, this basic interrupt handling protocol is limited by the node ID space of the cluster. Therefore, according to the present invention, systems having multiple instances of such multi-processor clusters are enabled by providing mechanisms which allow interrupts generated in a particular cluster to be seen by processors in remote clusters without requiring that the resources in any of the clusters to be aware of any of the resources outside of their cluster. According to specific embodiments, these mechanisms are embodied in interconnection controllers in each cluster which abstract the global processor space to the processors within their respective clusters.

Figure 5A:
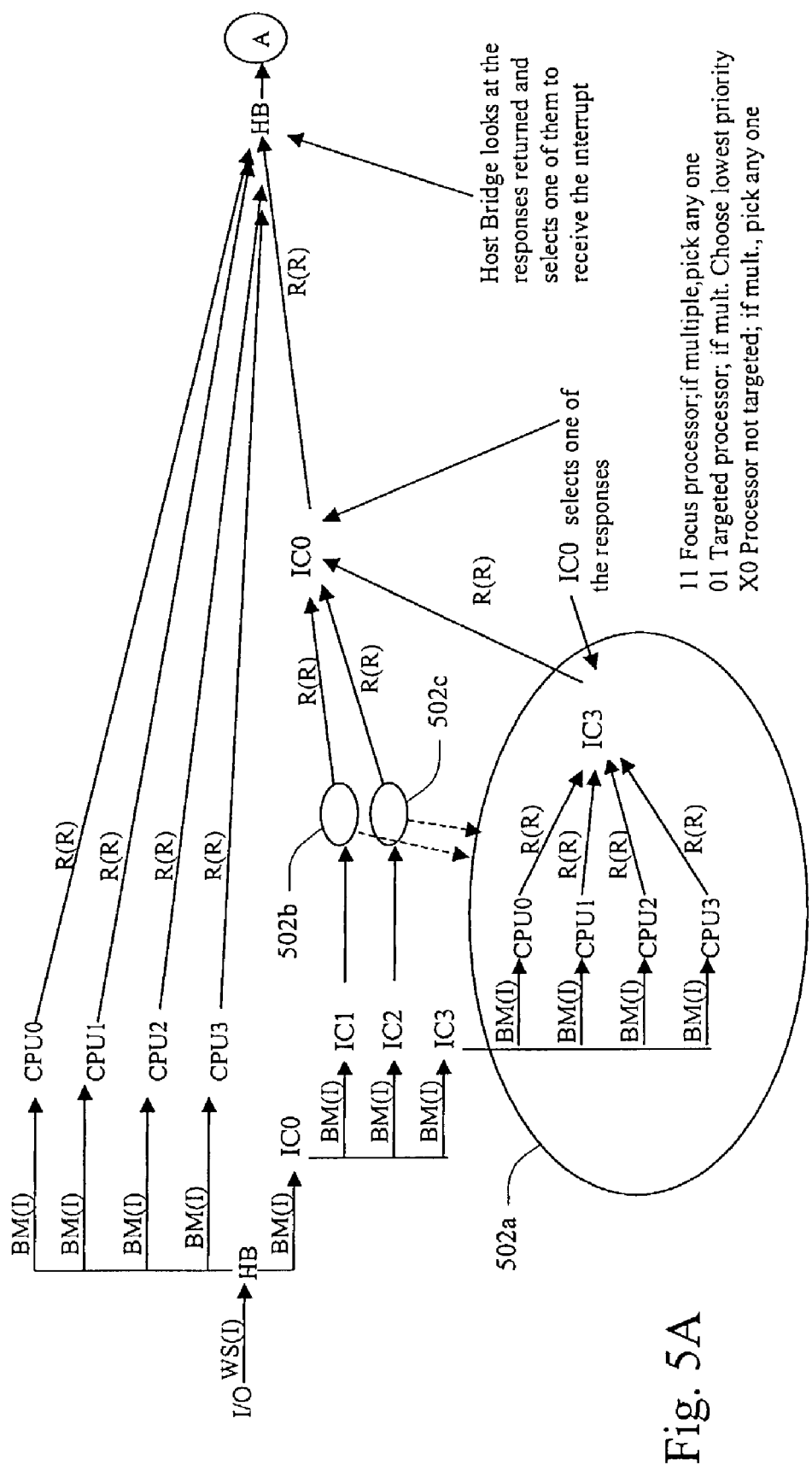
FIGS. 5A and 5B are process flow diagrams illustrating an exemplary process for handling arbitrated interrupts according to a specific embodiment of the invention.

An exemplary process for handling arbitrated interrupts in a multi-cluster system will now be described with reference to FIGS. 5A and 5B. The process flow is from left to right. A single CPU for each cluster node is assumed. However, it will be understood that systems having fewer or greater than one CPU per cluster node is within the scope of the invention.

Initially a device, e.g., an I/O device, associated with a node in a first cluster (associated with interconnection controller IC0) generates an interrupt, e.g., a write-sized interrupt (WS(I)), which is received by the node's host bridge (HB). The host bridge determines that an arbitrated interrupt needs to be generated based on information contained in the interrupt packet and broadcasts the interrupt (BM(I)) to each of the processors in the cluster (e.g., CPU0–CPU3) as well as the local interconnection controller (e.g., IC0) via the cluster's point-to-point architecture. Each of the clusters processors determines whether it is a focus processor, a target processor, or neither, and generates a read response (R(R)) which is transmitted back to the host bridge from which the broadcast interrupt message originated. According to a specific embodiment, a read response includes a data payload.

To make the locally generated interrupt visible throughout the multi-cluster system the local interconnection controller broadcasts the interrupt message to the interrupt controllers associated with each of the remote clusters in the system, e.g., IC1–IC3, via the global interconnect structure which may correspond to any of a variety of protocols and topologies including, for example, a plurality of point-to-point links as described above with reference to FIGS. 1A and 1B.

Each interconnection controller receiving the interrupt message broadcast by IC0 rebroadcasts the interrupt message to all of the processors in its cluster as shown in oval 502a associated with IC3. As indicated in the figure with the two other instances of the oval, i.e., 502b and 502c, each of interconnection controllers IC1 and IC2 behave similarly. As with the processors associated with the cluster from which the interrupt originated, each of the processors in each of these remote clusters determines whether it is a focus processor, a target processor, or neither, and generates a read response which is transmitted back to the local interconnection controller (i.e., as if it were the originating host bridge) via the cluster's point-to-point infrastructure.

The interconnection controller receives all of the read responses from its local processors and transmits one read response back to the interconnection controller in the cluster from which the interrupt originated, e.g., IC0. According to one embodiment, IC3 selects one of the read responses received from its local processors based on information in the data payload of the read responses identifying the corresponding processors as focus, targeted, or non-targeted processors, and priority information in cases where multiple processors respond as targeted. According to a more specific embodiment, this priority information is predetermined.

Similarly IC0 receives all of these read responses from the remote clusters and transmits one read response back to the host bridge from which the interrupt message originated. The mechanism by which the one read response is selected is similar to that described above for each of the remote processors. This read response is received in parallel with the read responses from the local processors in the originating cluster mentioned above. Thus, all of the processors in all of the clusters have seen and responded to the interrupt message in such a way that all relevant response information is received by the originating host bridge. According to a specific embodiments, each of the responses uniquely identifies the associated processor using a processor ID which is unique over all of the clusters. This unique processor ID may be analogized to the processor IDs employed by previous APIC design points and may or may not relate to the cluster and node IDs of the system.

Figure 5B:
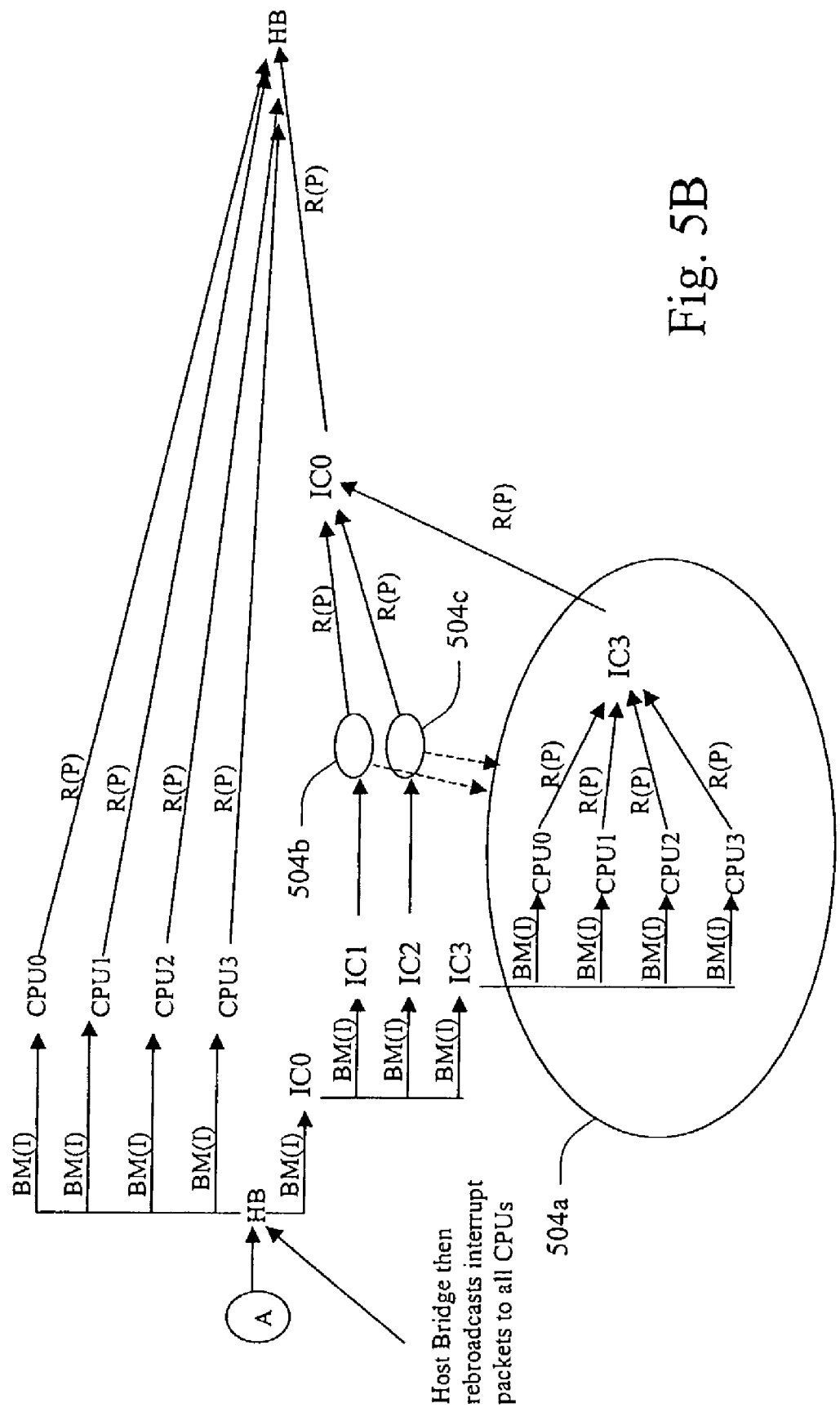

Referring now to FIG. 5B, once the originating host bridge receives read responses from all of the processor from which it expects to see such responses, it decides to which processor it will direct the interrupt based on these read responses, and rebroadcasts the original interrupt targeting that processor. As will become clear with reference to FIG. 6, once the arbitration is complete and the processor to which the interrupt should be targeted has been identified, the subsequent interrupt handling occurs in a manner similar to a directed or non-vectored interrupt.

It should be noted that embodiments of the invention are contemplated in which the retransmitted interrupt is not broadcast to all processors in the system, i.e., it is only transmitted to the targeted processor. This could be accomplished, for example, by providing a mapping between the global processors IDs and the corresponding nodes in the corresponding clusters. According to one embodiment, this mapping is maintained by the interconnection controllers in each cluster.

Referring once again to FIG. 5B, each of the processors in the originating cluster (e.g., CPU0–CPU3) receives the broadcast interrupt (BM(I)) and generates a probe response (R(P)) to the host bridge indicating whether or not it was targeted by and is handling the interrupt. According to a specific embodiment, a probe response includes a single bit which identifies the corresponding processor as either targeted or not. Interconnection controller IC0 also receives the rebroadcast interrupt and broadcasts the interrupt message to the interrupt controllers associated with each of the remote clusters in the system, e.g., IC1–IC3, as described above with reference to FIG. 5A.

Each of these remote interconnection controllers rebroadcasts the interrupt message to all of the processors in its cluster as shown in oval 504*a* associated with IC3. As indicated in the figure with the two other instances of the oval, i.e., 504*b* and 504*c*, IC1 and IC2 behave similarly. As with the processors associated with the originating cluster, each of the processors in each of these remote clusters determines whether it is the target processor and generates a response which is transmitted back to the local interconnection controller as if it were the originating host bridge.

Each remote interconnection controller receives all of the probe responses from its local processors and transmits one probe response back to the interconnection controller in the cluster from which the interrupt originated, e.g., IC0. According to one embodiment, each remote interconnection controller, e.g., IC3, selects one of the probe responses received from its local processors based on whether or not any of the local processors responds as the targeted processor. According to one embodiment, if none were targeted, the remote interconnection controller can select any of the responses to forward.

Similarly IC0 receives all of these probe responses from the remote clusters and transmits one probe response back to the host bridge from which the interrupt message originated. This probe response is received in parallel with the probe responses from the local processors in the originating cluster mentioned above. Thus, regardless of which processor in the multi-cluster system is handling the interrupt, the originating host bridge is notified accordingly.

Figure 6:
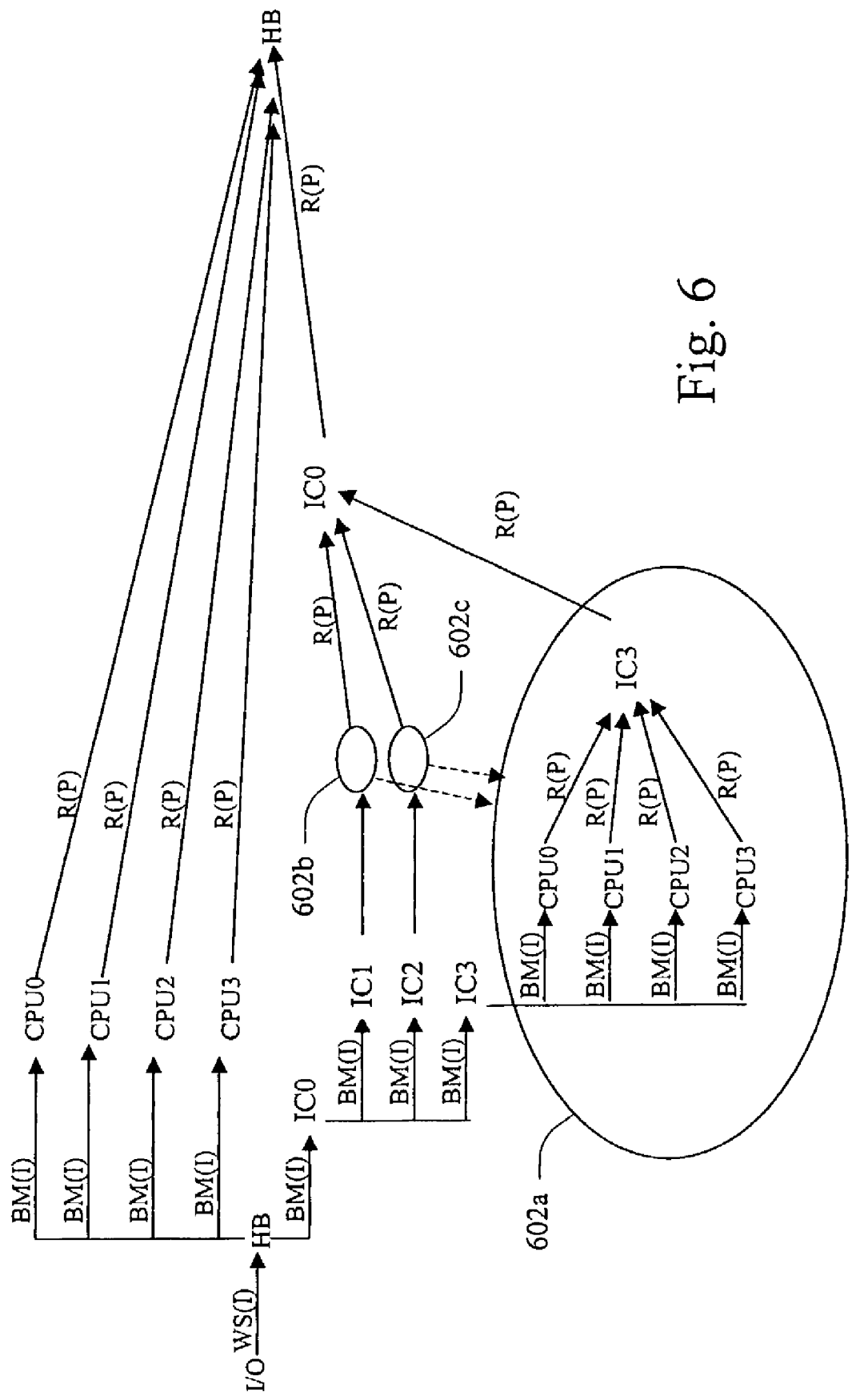
FIG. 6 is a process flow diagram illustrating an exemplary process for handling directed or non-vectored interrupts according to another specific embodiment of the invention.

Referring now to FIG. 6, an exemplary process by which directed or non-vectored interrupts may be handled according to the present invention will be described. As will be understood, the operation of this embodiment is similar to the second half of the arbitrated interrupt handling process described above with reference to FIG. 5B. Initially a device, e.g., an I/O device, associated with a node in a first cluster generates an interrupt, e.g., a write-sized interrupt (WS(I)), which is received by the node's host bridge (HB). The host bridge determines that a directed or non-vectored interrupt needs to be generated based on information contained in the interrupt packet and broadcasts the interrupt (BM(I)) to each of the processors in the cluster (e.g., CPU0–CPU3) as well as the local interconnection controller (e.g., IC0).

Each of the clusters processors determines whether it is the target processor, and generates a probe response (R(P)) which is transmitted back to the host bridge indicating whether or not it was targeted by and is handling the interrupt. According to a specific embodiment, a probe response includes a single bit which identifies the corresponding processor as either targeted or not. Interconnection controller IC0 broadcasts the interrupt message to the interrupt controllers associated with each of the remote clusters in the system, e.g., IC1–IC3.

Each of these remote interconnection controllers rebroadcasts the interrupt message to all of the processors in its cluster as shown in oval 602*a* associated with IC3. As indicated in the figure with the two other instances of the oval, i.e., 602*b* and 602*c*, IC1 and IC2 behave similarly. As with the processors associated with the originating cluster, each of the processors in each of these remote clusters determines whether it is the target processor and generates a response which is transmitted back to the local interconnection controller as if it were the originating host bridge.

Each remote interconnection controller receives all of the probe responses from its local processors and transmits one probe response back to the interconnection controller in the cluster from which the interrupt originated, e.g., IC0. According to one embodiment, each remote interconnection controller, e.g., IC3, selects one of the probe responses received from its local processors based on whether or not any of the local processors responds as the targeted processor. According to one embodiment, if none were targeted, the remote interconnection controller can select any of the responses to forward.

Similarly IC0 receives all of these probe responses from the remote clusters and transmits one probe response back to the host bridge from which the interrupt message originated. This probe response is received in parallel with the probe responses from the local processors in the originating cluster mentioned above. Thus, regardless of which processor in the multi-cluster system is handling the interrupt, the originating host bridge is notified accordingly. Note that if the host bridge is instructed to perform a posted broadcast, then no responses are returned.

While the invention has been particularly shown and described with reference to specific embodiments thereof, it will be understood by those skilled in the art that changes in the form and details of the disclosed embodiments may be made without departing from the spirit or scope of the invention. For example, specific embodiments have been described herein with reference to a particular multi-processor architecture. It will be understood, however, that the present invention applies more generally to a wide variety of multiprocessor architectures. In addition, various system aspects described herein relating to, for example, address mapping, routing mechanisms, and transaction identification, are merely exemplary and should not be used to limit the scope of the invention.

It should also be understood that the various embodiments of the invention may be implemented or represented in a wide variety of ways without departing from the scope of the invention. That is, for example, the interconnection controller described herein may be represented (without limitation) in software (object code or machine code), in varying stages of compilation, as one or more netlists, in a simulation language, in a hardware description language, by a set of semiconductor processing masks, and as partially or completely realized semiconductor devices. The various alternatives for each of the foregoing as understood by those of skill in the art are also within the scope of the invention. For example, the various types of computer-readable media, software languages (e.g., Verilog, VHDL), simulatable representations (e.g., SPICE netlist), semiconductor processes (e.g., CMOS), and device types (e.g., ASICs) suitable for designing and manufacturing the processes and circuits described herein are within the scope of the invention.

In addition, as the invention is directed generally toward hierarchical techniques for extending otherwise flat interrupt handling mechanisms, it should not be limited by specific details of the exemplary protocols described herein. For example, specific embodiments have been described herein in which interconnection controllers select one of multiple received responses to transmit to the cluster or host bridge from which the interrupt originated. However, it will be understood that embodiments in which the multiple received responses are combined into a single response are also contemplated. Similarly, the exemplary embodiment for handling arbitrated interrupts described above with reference to FIGS. 5A and 5B contemplates a rebroadcasting of a directed interrupt once the arbitration is complete to all of the processors in the system. It should be understood, however, that embodiments in which the subsequent directed interrupt is sent only to the processor identified by the arbitration are contemplated.

Finally, although various advantages, aspects, and objects of the present invention have been discussed herein with reference to various embodiments, it will be understood that the scope of the invention should not be limited by reference to such advantages, aspects, and objects. Rather, the scope of the invention should be determined with reference to the appended claims.

What is claimed is:

1. A computer system comprising a plurality of processor clusters, each cluster including a plurality of local nodes and an interconnection controller, each interconnection controller being operable to transmit locally generated interrupts to others of the clusters, and remotely generated interrupts to the local nodes, the interconnection controller in each cluster further being operable to aggregate locally generated interrupt responses for transmission to a first remote cluster from which a first interrupt corresponding to the locally generated responses was generated, the interconnection controller also being operable to aggregate remotely generated responses for transmission to a first local node from which a second interrupt corresponding to the remotely generated responses was generated, wherein the interconnection controller in each cluster is operable to aggregate the locally generated responses by selecting one of the locally generated responses for transmission.

2. The computer system of claim 1 wherein the interconnection controller in each cluster is operable to aggregate the locally generated responses by combining information from at least two of the locally generated responses into a combined response.

3. The computer system of claim 1 wherein the interconnection controller in each cluster is operable to aggregate the remotely generated responses by selecting one of the remotely generated responses for transmission.

4. The computer system of claim 1 wherein the interconnection controller in each cluster is operable to aggregate the remotely generated responses by combining information from at least two of the remotely generated responses into a combined response.

5. The computer system of claim 1 wherein the interconnection controller in each cluster is operable to aggregate the locally and remotely generated responses with reference to information associated with at least some of the responses.

6. The computer system of claim 1 wherein the first and second interrupts comprise arbitrated interrupts, and the locally and remotely generated responses each indicate whether an associated processor is a target processor, a focus processor, or neither.

7. The computer system of claim 1 wherein the first and second interrupts comprise directed interrupts and the locally and remotely generated responses each indicate whether an associated processor is a target processor.

8. The computer system of claim 1 wherein the local nodes and the interconnection controller in each cluster are interconnected by a point-to-point architecture.

9. The computer system of claim 8 wherein the plurality of clusters comprises four clusters.

10. The computer system of claim 8 wherein the plurality of local nodes in each cluster comprises four local processors.

11. The computer system of claim 1 wherein the locally and remotely generated interrupts are broadcast to all of the clusters.

12. In computer system comprising a plurality of processor clusters, each cluster including a plurality of local nodes and an interconnection controller, a method for handling interrupts, comprising:

transmitting locally generated interrupts to others of the clusters using the interconnection controller;

transmitting remotely generated interrupts to the local nodes using the interconnection controller;

using the interconnection controller, aggregating locally generated interrupt responses for transmission to a first remote cluster from which a first interrupt corresponding to the locally generated responses was generated, wherein aggregating locally generated interrupt response includes combining information from at least two of the locally generated responses into a combined response; and using the interconnection controller, aggregating remotely generated responses for transmission to a first local node from which a second interrupt corresponding to the remotely generated responses was generated.

13. An interconnection controller for use in a computer system comprising a plurality of processor clusters, each cluster including a plurality of local nodes and an instance of the interconnection controller, the interconnection controller comprising circuitry which is operable to transmit locally generated interrupts to others of the clusters, and remotely generated interrupts to the local nodes, the circuitry further being operable to aggregate locally generated responses by selecting one of the locally generated interrupt responses for transmission to a first remote cluster from which a first interrupt corresponding to the locally generated responses was generated, the circuitry also being operable to aggregate remotely generated responses by selecting one of the remotely generated responses for transmission to a first local node from which a second interrupt corresponding to the remotely generated responses was generated.

14. An integrated circuit comprising the interconnection controller of claim 13.

15. The integrated circuit of claim 14 wherein the integrated circuit comprises an application-specific integrated circuit.

16. At least one computer-readable medium having data structures stored therein representative of the interconnection controller of claim 13.

17. The at least one computer-readable medium of claim 16 wherein the data structures comprise a simulatable representation of the interconnection controller.

18. The at least one computer-readable medium of claim 17 wherein the simulatable representation comprises a netlist.

19. The at least one computer-readable medium of claim 16 wherein the data structures comprise a code description of the interconnection controller.

20. The at least one computer-readable medium of claim 19 wherein the code description corresponds to a hardware description language.

21. A set of semiconductor processing masks representative of at least a portion of the interconnection controller of claim 13.

22. A computer system comprising a plurality of processor clusters, each cluster including a plurality of local nodes and an interconnection controller, each interconnection controller being operable to transmit a first interrupt generated by first local node to others of the clusters, the interconnection controller also being operable to aggregate remotely generated responses corresponding to the first interrupt for transmission to the first local node, wherein the interconnection controller in each cluster is operable to aggregate the remotely generated responses by selecting one of the remotely generated responses.

23. The computer system of claim 22 wherein the interconnection controller in each cluster is operable to aggregate the remotely generated responses by combining information from at least two of the remotely generated responses into a combined response.

24. The computer system of claim 22 wherein the interconnection controller in each cluster is operable to aggregate the remotely generated responses with reference to information associated with at least some of the responses.

25. The computer system of claim 22 wherein the first interrupt comprises an arbitrated interrupt, and the remotely generated responses each indicate whether an associated processor is a target processor, a focus processor, or neither, the interconnection controller being operable to transmit an aggregated response to the first local node.

26. The computer system of claim 25 wherein the first local node is operable to select from among the aggregated response and a plurality of locally generated responses from associated local nodes and generate a directed interrupt in response thereto corresponding to a processor associated with the selected response.

27. The computer system of claim 26 wherein the first local node is operable to broadcast the directed response to all of the clusters.

28. The computer system of claim 27 wherein the first local node is operable to transmit the directed response only to the cluster associated with the processor associated with the selected response.

29. The computer system of claim 28 wherein the interconnection controller in each cluster maintains a mapping relating processor IDs and nodes in each of the other clusters to facilitate transmission of the directed response only to the cluster associated with the processor associated with the selected response.

30. The computer system of claim 22 wherein the first interrupt comprises a directed interrupt and the remotely generated responses each indicate whether an associated processor was a target processor.

31. The computer system of claim 22 wherein the first interrupt is broadcast to all of the clusters.

32. An interconnection controller for use in a computer system having a plurality of processor clusters, each cluster including a plurality of local nodes and an instance of the interconnection controller, the interconnection controller comprising circuitry which is operable to transmit a first interrupt generated by first local node to others of the clusters, the circuitry also being operable to aggregate remotely generated responses corresponding to the first interrupt for transmission to the first local node by combining remotely generated responses into a single response for transmission to the first local node.

* * * * *